UNITED STATES PATENT OFFICE.

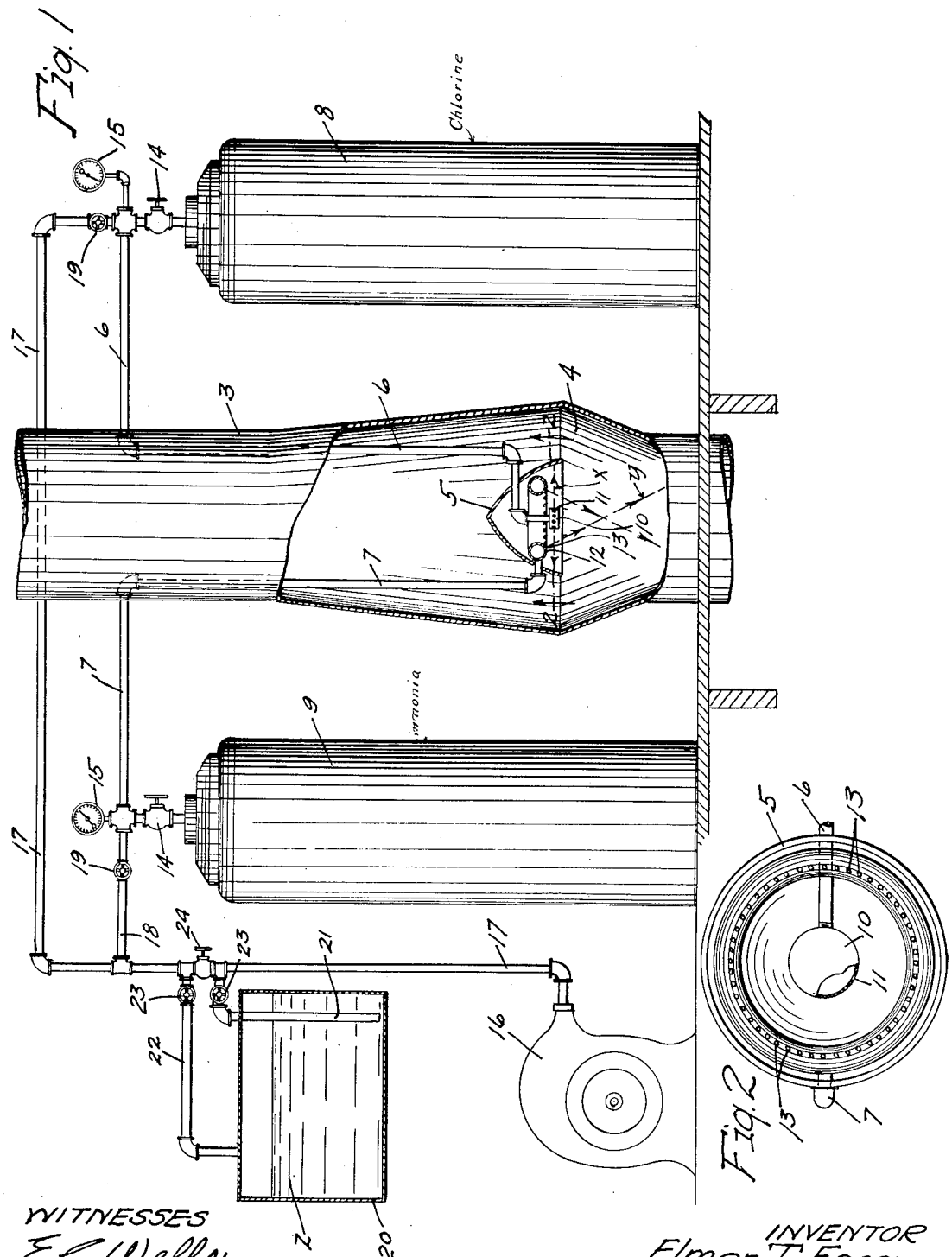

ELMER T. FEGAN, OF MINNEAPOLIS, MINNESOTA, ASSIGNOR OF ONE-HALF TO ARNO RICHARD SASSE, OF KANSAS CITY, MISSOURI.

PROCESS OF BLEACHING AND IMPROVING FLOUR.

1,330,937. Specification of Letters Patent. Patented Feb. 17, 1920.

Application filed March 18, 1918. Serial No. 223,203.

*To all whom it may concern:*

Be it known that I, ELMER T. FEGAN, a citizen of the United States, residing at Minneapolis, in the county of Hennepin and State of Minnesota, have invented certain new and useful Improvements in Processes of Bleaching and Improving Flour; and I do hereby declare the following to be a full, clear, and exact description of the invention, such as will enable others skilled in the art to which it appertains to make and use the same.

This invention relates to a process of treating flour, and more particularly to the artificial bleaching and improving of the same.

I use the term flour herein, to include the ground and bolted product of clean cereals, such as rye, barley, corn, rice and oats, as well as wheat.

In the commercial production of cereal flour it is desirable that the natural color be modified, and the flour be aged or matured, so as to produce good bread immediately after grinding. This can be accomplished by keeping the flour several months after milling, but time and space are valuable. By artificial bleaching is meant, a treatment of the flour to remove the objectionable color present, by chemical means, thereby immediately improving its natural color. By an improvement in flour is meant, any treatment or an addition of compounds, that will improve the flour in quality or condition, so that when used for breadmaking, a better loaf is produced, and a saving in baking ingredients, and a shortening of the period of fermentation is effected. The present invention has to do with a method of artificial bleaching, maturing and improving flour without a waste of time, without deleterious effects, and in one operation.

The bleaching qualities of chlorin are too well known to be fully discussed here, but it only needs to be said that it has been taken advantage of, in the art of flour bleaching, as exemplified in several prior patents. But bleaching with chlorin gas has been rather unsatisfactory, because, unless the process is properly handled, it will not produce the results without injuring the gluten of the treated flour. Chlorin will act on any moisture (water) present in the flour, or as an impurity in the gas to form hydrochloric acid, which is extremely injurious to the flour.

In manufacturing bread, the addition of other substances in flour, water and leavening (yeast) is recognized as an essential part of the manufacture. In fact, some stimulant is necessary, and accordingly, materials such as salt, shortening, sugar, potatoes, malt, starch and mineral bodies are a regular part of the process of bread making. The addition of these materials, besides flavoring the finished bread, is for the purpose of furnishing the growing yeast with food. The practice of adding crystals of ammonia salts, such as the chlorid, together with other substances, mainly alum, potassium bromate, calcium sulfate, etc., has been followed in many baking establishments to improve the baking qualities of the flour, and at the same time to save flour, sugar and yeast. The ammonia salts, because of their nitrogen content, furnish the necessary available nitrogenous food for the yeast. In the fermentation process the ammonia salts are used up and by the time the bread leaves the oven or reaches the trade, no trace of ammonia or its salts can be detected. They have been converted into human food by the yeast.

My invention, therefore, consists broadly in the process of subjecting flour to the action of gaseous ammonia, gaseous chlorin, and the products, both gaseous and solid, resulting from the chemical union of the heretofore mentioned gases in the presence of moisture. In so doing the flour is momentarily subjected to the bleaching and maturing action of the chlorin. Moreover, the ammonia gas with the moisture present, both in the flour or introduced with the gas, forms the alkaline ammonium hydroxid, which neutralizes the acid constituents, that are present in the flour. When the stream of chlorin comes into contact with the stream of ammonia in the treating chamber, there is formed the crystalline ammonium chlorid. The greater part of the introduced gases unite chemically to form the desirable salt, but, nevertheless, there will be left enough uncombined ammonia and chlorin in the chamber to perform the neutralizing and bleaching functions, respectively. It will be found necessary, in treating certain soft winter flours by this process, to increase the amount of chlorin over that of the ammonia, so that a shortening effect will be worked on the gluten.

It was stated above that, often hydrochloric acid (HCl) was formed when impure chlorin was used for bleaching, consequently rendering the process unsatisfactory. In my process, any hydrochloric acid formed will unite immediately with the uncombined ammonia, forming ammonium chlorid (NH$_4$Cl). In fact this is very similar to the reaction that actually takes place when ammonia (NH$_3$) and chlorin (Cl$_2$) unite in the treating chamber, as will be seen in the following equations:

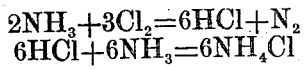

Of course, the HCl is only an intermediate product, and is not free long enough to injure the flour.

In the accompanying drawings, I have illustrated an apparatus suitable for carrying the above described invention into practical use, and wherein like characters indicate like parts throughout the several views.

Referring to the drawings:

Figure 1 is a view of the apparatus, principally in elevation, with some parts broken away and some parts sectioned; and Fig. 2 is a detail view in section, taken on the line 2—2 of Fig. 1, on an enlarged scale.

The numeral 3 indicates a perpendicular chute or spout having a horizontally expanded treating chamber 4, through which flour is conveyed or precipitated. An inverted bowl 5, made of porcelain or metal, that will withstand the action of the introduced gases, is axially located in the treating chamber 4, and held suspended by pipes or conduits 6 and 7, provided for a purpose that will presently appear. In case the bowl 5 is used in regular mill spouting, its shape should be such that a choke will not take place between the bowl and sides of the spouting. The pipe 6 leads from the top of a tank 8, holding a suitable supply of chlorin, under pressure, and likewise the pipe 7 leads from the top of a tank 9, holding a suitable supply of ammonia, under pressure.

On the delivery end of the pipe 6, is a cylindrical distributer head 10, axially located in the bowl 5, just above the lower edge thereof. In the vertical annular wall of the distributer head 10, is formed a multiplicity of small circumferentially spaced bores 11, through which radial streams of chlorin gas, from the tank 8, are discharged in a horizontal plane, as indicated by broken lines X in Fig. 1. Also axially located within the bowl 5, close to the wall thereof, above the distributer head 10, is a relatively large distributer 12, in the form of a horizontally disposed annular pipe, into which is tapped the delivery end of the pipe 7, which affords the support therefor. A multiplicity of small circumferentially spaced bores 13 are formed in the under side of the distributer 12, and so arranged as to discharge therefrom downwardly converging streams of ammonia gas, from the tank 9, as indicated by broken lines Y in Fig. 1. It will thus be seen that the streams of ammonia gas are delivered obliquely into the streams of chlorin gas.

If so desired, the distributer head 10 and the distributer 12 may be provided with nozzles (not shown) to take the place of the discharge bores 11 and 13, respectively. These nozzles may be made in various different sizes and one size of nozzles substituted for another, as the occasion demands. A suitable regulating valve 14, and gage 15, are interposed in each of the pipes 6 and 7, just above the tanks 8 and 9, respectively, to enable an operator to independently control the supply of chlorin and ammonia sprayed into the treating chamber 4, from the distributer head 10 and distributer 12.

In addition to the above steps, it may, in some instances, be desirable to mix the gases introduced into the treating chamber 4 with an inert gas or air. For this purpose I provide a blower 16, of suitable construction, to deliver gas or air, under pressure, through a main pipe 17, tapped into the pipe 6, at a point just above the tank 8, and a branch pipe 18, leading from said main pipe and tapped into the pipe 7, just above the tank 9. Valves 19 are interposed in the main pipe 17 and branch pipe 18, close to their delivery ends, whereby the operator can independently control the gas or air from the blower 16 to the pipes 6 and 7.

The gas or air from the blower 16 may be saturated with water vapor by forcing the same through a body of water Z, in a supply tank 20. To accomplish this result, branch pipes 21 and 22 are tapped into the main pipe 17, the latter above the former. The branch pipe 21 extends downward through the top of the tank 20, and terminates just above the bottom thereof, and the branch pipe 22 also extends through the top of said tank, but terminates above the water level. A cut-off valve 23 is interposed in each of the branch pipes 21 and 22, and a cut-off valve 24 is interposed in the main pipe 17. Gas or air delivered into the main pipe 17 by the blower 16, when the valve 24 is closed, passes through the branch pipe 21 and into the body of water in the tank 20. The gas or air saturated with moisture is conveyed from the tank 20, through the branch pipe 22, delivery section of the main pipe 17, and branch pipe 18, to the pipes 6 and 7. By closing the valve 23 and opening the valve 24 the gas or air from the blower 16 is conveyed directly to the pipes 6 and 7.

The many streams of ammonia gas issuing from the discharge bores 13, in the distributer 12, meet those of the chlorin gas issuing from the bores 11, in the distributer head 10, causing a chemical reaction which produces tiny crystals of ammonium chlorid. These tiny crystals of ammonium chlorid form in a cloud at the junction of the gas streams, which thoroughly mix with the falling flour. The uncombined gases perform their separate bleaching and neutralizing functions, but ultimately unite to form still more ammonium chlorid.

I desire it to be understood that my invention is not limited to the addition of the chlorin and ammonia in the manner just described, but other modifications and changes may be made within the spirit of the invention and still be within the scope of the following claims.

What I claim is:

1. The process of conditioning flour which consists in subjecting the same to a mixture of chlorin and ammonia gases or vapors and in forming a precipitate of ammonium chlorid in the presence of the flour.

2. The process of bleaching and improving flour which consists in subjecting the flour during overlapping intervals of time to the action of chlorin and ammonia gases or vapors and in producing ammonium chlorid in the presence of the flour.

3. The process of conditioning flour which consists in passing the same in a shower through a mixture of chlorin and ammonia gases and commingling the flour with the resulting precipitate of ammonium chlorid.

4. The process of treating flour consisting in subjecting the flour to the action of ammonia and chlorin gases for the purpose set forth.

5. The process of treating flour, which consists in agitating the flour to separate the finely divided particles thereof and, during the agitation, subjecting the same to the action of ammonia and chlorin gases, for the purpose set forth.

In testimony whereof I affix my signature in presence of two witnesses.

ELMER T. FEGAN.

Witnesses:
 HULDA LIEDER,
 HARRY D. KILGORE.